US 6,714,696 B2

(12) United States Patent
Kishimoto et al.

(10) Patent No.: US 6,714,696 B2
(45) Date of Patent: Mar. 30, 2004

(54) LIGHT-WAVE CIRCUIT MODULE AND METHOD FOR MANUFACTURING THE SAME

(75) Inventors: Yoshio Kishimoto, Hirakata (JP); Masahiro Mitsuda, Uji (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 54 days.

(21) Appl. No.: 10/026,804

(22) Filed: Dec. 27, 2001

(65) Prior Publication Data

US 2002/0085785 A1 Jul. 4, 2002

(30) Foreign Application Priority Data

Dec. 28, 2000  (JP)  ........................................ 2000-400396

(51) Int. Cl.$^7$ ................................................. G02B 6/121
(52) U.S. Cl. ............................... 385/14; 385/33; 372/45
(58) Field of Search ................................. 385/14, 8, 33, 385/2, 31, 24; 372/45, 50, 46, 49

(56) References Cited

U.S. PATENT DOCUMENTS

| 4,838,634 A | 6/1989 | Bennion et al. |
| 5,690,863 A | 11/1997 | Schuman |

FOREIGN PATENT DOCUMENTS

| JP | 08-264748 | 10/1996 |
| JP | 09-251113 | 9/1997 |

OTHER PUBLICATIONS

Specifications for U.S. patent application Ser. No. 09/804,072, "Optical Module and Method for Producing the Same, and Optical Circuit Device".

*Primary Examiner*—Phan T. H. Palmer
(74) *Attorney, Agent, or Firm*—McDermott, Will & Emery (57) ABSTRACT

The light-wave circuit module includes a substrate having a spot of substantially circular concave shape, an optically reflective film formed along an inner surface of the spot, and a planar optical waveguide passing through the spot. Light in the optical waveguide is reflected and focused obliquely upward by the optically reflective film in the spot.

20 Claims, 8 Drawing Sheets

PRIOR ART

LIGHT-WAVE CIRCUIT MODULE AND METHOD FOR MANUFACTURING THE SAME

BACKGROUND OF THE INVENTION

The present invention relates to a light-wave circuit module used for optical communication, optical information processing or the like, and to a method for manufacturing the same.

Optical devices, such as semiconductor lasers, photodetectors, optical switches and the like, which are used for optical communication and optical information processing for example, are usually coupled with an optical fiber, such that light can be input and output, to send/receive signal light. Conventionally, various optical modules have been produced, such as an optical fiber modules, in which an optical fiber is assembled in a module.

On the other hand, different from these optical fiber modules, planar light-wave circuit (PLC) modules have been proposed, in which planar optical waveguides including optical waveguides, and optical function elements, such as a semiconductor laser or a photodetector, are integrated on the same substrate. With such PLC modules, automation of the assembly is possible, so that they are very promising as one of the compact optical modules for optical waveguide integrated devices.

Conventionally, PLC modules have been developed mainly as optical switches and optical branch couplers. As the optical waveguides used in PLC modules, there are quartz-based optical waveguides, which are based on quartz, and organic optical waveguides, which are based on an organic polymer material. Among these, even though organic polymer-based optical waveguides are problematic regarding heat resistance and performance, they can be easily formed into transparent films, so that they are promising with regard to cost, number of processing steps etc.

A conventional organic polymer-based PLC module is disclosed in Japanese Laid-Open Patent Publication No. 08-264748. This PLC module is explained with reference to FIG. 8.

Figure 8:
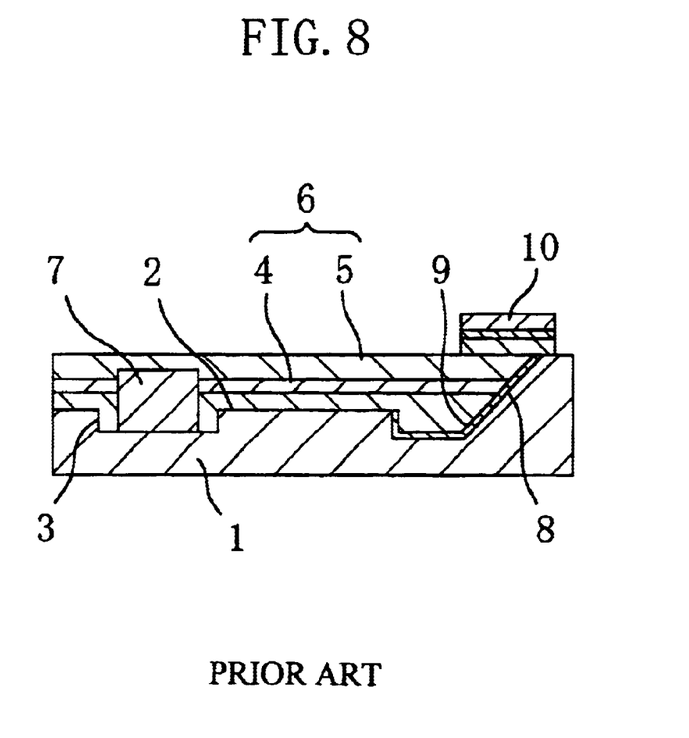
FIG. 8 is a cross-sectional view showing schematically a configuration of the conventional PLC module.

FIG. 8 schematically shows the cross-sectional configuration of the PLC module disclosed in this publication. As shown in FIG. 8, in this PLC module, in a substrate 1 made of Si, a groove 2 is formed extending in the longitudinal direction of the substrate 1, and a concave portion 3 that is wider than the groove 2 is formed in a perpendicular direction to the groove 2. A translucent organic material is applied or filled into the groove 2 and the concave portion 3, and this translucent organic material constitutes an organic optical waveguide 6 made of a core layer 4 and a ground layer 5. A semiconductor laser 7, which is accommodated in the concave portion 3, is buried by the translucent organic material.

In the substrate 1, an oblique mirror surface 8 is formed at an angle of 45° with the principal surface of the substrate 1, and a reflective film 9 is provided on the oblique mirror surface 8. A rear-side coupling photodetector 10, which has its photodetecting portion at a position where laser light that has been reflected by the reflective film 9 is irradiated, is arranged above the oblique mirror surface 8.

With the conventional configuration shown in FIG. 8, a PLC module can be attained, in which the optical waveguide 6 does not peel off easily from the substrate 1, and in which the positioning precision of the optical waveguide 6 and the reliability of the optical coupling with the semiconductor laser 7 are high. Furthermore, the laser light from the oblique mirror surface 8 can be monitored with the photodetector 10 on the substrate 1.

However, the above-described conventional PLC module provided with a photodetector poses the following problems. In conventional PLC modules, the oblique mirror surface 8 is planar, so that when broadened laser light is incident on the oblique mirror surface 8, then also the reflected laser light is broadened when it is incident on the photodetector 10. Therefore, it is not possible to utilize the laser light with high efficiency.

Furthermore, if the optical waveguide 6 is shifted with respect to the horizontal direction of the substrate 1, then the position where the intensity of the reflected laser light is large shifts with respect to the position of the photodetecting portion of the photodetector 10, and as a result, there is the problem that the laser light cannot be utilized efficiently.

It is an object of the present invention to solve these problems, and to provide a light-wave circuit module in which laser light that has passed through an optical waveguide can be coupled with high efficiency into a photodetector.

SUMMARY OF THE INVENTION

A first light-wave circuit module in accordance with the present invention includes a substrate having a spot of substantially circular concave shape, an optically reflective film formed along an inner surface of the spot, and a planar optical waveguide passing through the spot, wherein light of the optical waveguide is reflected and focused obliquely upward by the optically reflective film in the spot.

In a preferable embodiment, a portion of the planar optical waveguide is located in the spot, the portion of the planar optical waveguide is formed on the substrate with the optically reflective film being disposed between the portion and the substrate, and light that is guided along the planar optical waveguide leaks into the spot and is focused on a focal point that is set by the substantially circular concave shape.

A second light-wave circuit module in accordance with the present invention includes a substrate having a spot of substantially circular concave shape, and a groove that is formed on the substrate and linked to a portion of a perimeter of the spot, wherein at least a portion of a planar optical waveguide is formed in the groove, wherein an optically reflective film is formed on an inner surface of the spot, wherein an end face of the planar optical waveguide is located at a periphery of the spot, and wherein light that is guided by the optical waveguide enters the spot from the end face and is focused on a focal point that is determined by the substantially circular concave shape.

A third light-wave circuit module in accordance with the present invention includes a substrate having a spot of substantially circular concave shape, and a slanted path that is formed on the substrate and linked to at least a portion of a perimeter of the spot, wherein at least a portion of a planar optical waveguide is formed on the slanted path, and wherein, on an inner surface of the spot, an optically reflective film is formed at least on a side that is in opposition to the side linked to the slanted path.

A fourth light-wave circuit module in accordance with the present invention includes a substrate having a spot of concave shape, and a groove that is formed on the substrate and linked to a portion of a perimeter of the spot, wherein at least a portion of a planar optical waveguide is formed in the groove, wherein an optically reflective film is formed on an inner surface of the spot, and wherein a bottom surface of the groove is located near a bottom surface of the optically reflective film in the spot.

A fifth light-wave circuit module in accordance with the present invention includes a substrate on which a plurality of spots of substantially circular concave shape are formed, and an optically reflective film formed along inner surfaces of the spots, wherein the spots are linked by a planar optical waveguide.

In a preferable embodiment, the planar optical waveguide includes branched portions, the branched portions are linked to the spots, and at least a portion of the branched portions is made of a medium that transmits or reflects a certain wavelength, and photodetectors are provided above the spots.

A sixth light-wave circuit module in accordance with the present invention includes a substrate having a first surface and a second surface substantially in opposition to the first surface, a spot of substantially circular concave shape that is formed on the first surface of the substrate, and an optically reflective film that is formed along an inner surface of the spot, wherein a first planar optical waveguide is provided on the first surface, wherein a second planar optical waveguide is provided on the second surface, wherein the first planar waveguide is linked to the spot, wherein a through hole connecting the first surface and the second surface is formed in a portion of the spot, and wherein the second planar optical waveguide is linked to the spot through a translucent medium that is filled into the through hole.

It is preferable that the planar optical waveguide is made of a transparent translucent resin.

A method for manufacturing a light-wave circuit module having a substrate having a spot of substantially circular concave shape and an optical waveguide linked to the spot, includes a step of preparing a substrate made of a polymer sheet, and a step of forming a concave surface of the spot by subjecting the substrate to embossing by applying at least one selected from heat and pressure.

A seventh light-wave circuit module in accordance with the present invention includes a concave portion having a substantially circular arc-shaped surface or substantially spherical surface, formed on a substrate, an optical waveguide formed on the substrate, and a photodetector arranged above the concave portion and receiving light that has been transmitted by the optical waveguide and reflected by the concave portion.

It is preferable that at least a portion of the optical waveguide is slanted with respect to a principal surface of the substrate.

An eighth light-wave circuit module in accordance with the present invention includes a step portion having a substantially circular arc-shaped surface or substantially spherical surface, formed on a substrate, an optical waveguide formed on the substrate, and a photodetector arranged above the step portion and receiving light that has been transmitted by the optical waveguide and reflected by the step portion.

It is preferable that an optically reflective film is formed on an inner surface of the concave portion.

With the present invention, light from an optical waveguide is reflected by a substantially circular concave spot, or a concave portion or a step portion (such as a concave portion) having a substantially circular arc-shaped surface or substantially spherical surface, and the light is focused onto one point or a very narrow range. Consequently, even when the light guided by the optical waveguide is broadened when it is incident on the concave portion or the like, the light is focused, so that it can be coupled with high efficiency into the photodetector.

In accordance with the present invention, the spot has a substantially circular concave shape, so that the light that is guided by the optical waveguide can be focused by reflection at the concave shape of the spot. Consequently, a light-wave circuit module can be presented, in which laser light (signal light) that has traveled along the optical waveguide can be coupled with high efficiency into the photodetector. When used as a photodetecting device with a photodetector mounted on a light-wave circuit module of the present invention, light can be received with high efficiency, so that a PLC module can be realized with which even very small amounts of signal light can be received.

DETAILED DESCRIPTION OF THE INVENTION

The following is a description of embodiments of the present invention, with reference to the accompanying drawings. In order to simplify the explanations, structural elements in the drawings that have substantially the same function are denoted by the same reference numerals. It should further be noted that the present invention is not limited to the following embodiments.

First Embodiment

Figure 1A:
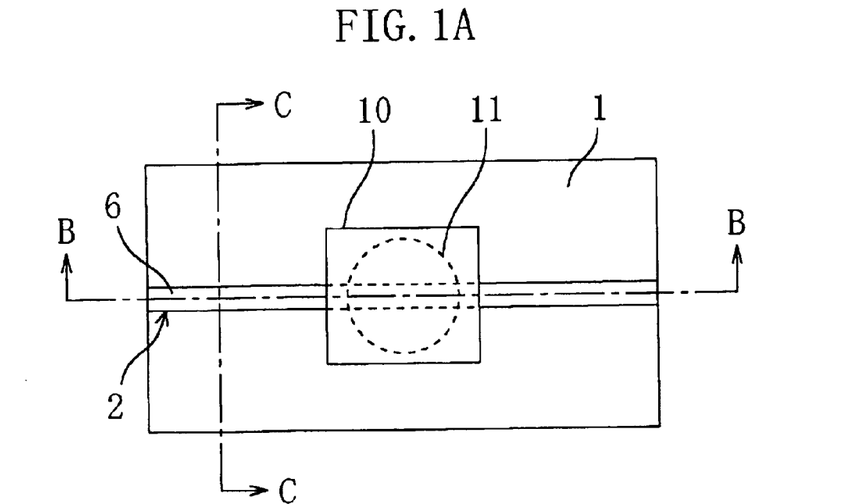
FIGS. 1A to 1C are, respectively, a plan view, a cross-sectional view taken along the line B—B, and a cross-sectional view taken along the line C—C of a light-wave circuit module according to the first embodiment of the present invention.
Figure 1B:
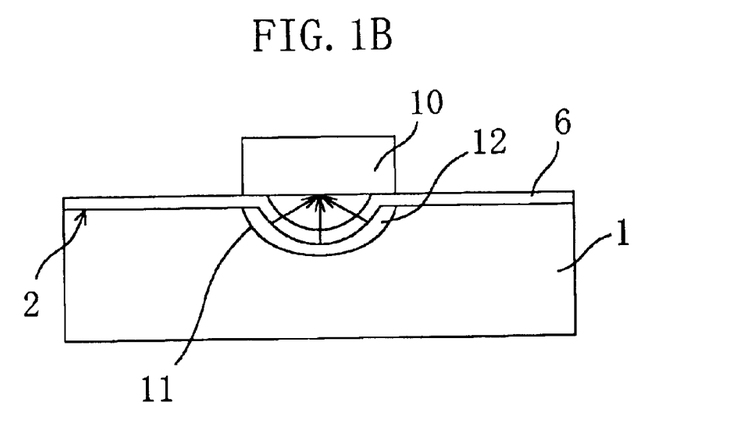
Figure 1C:
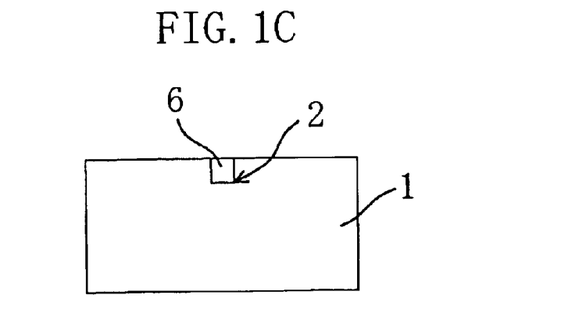

FIGS. 1A to 1C schematically show the configuration of a light-wave circuit module in accordance with a first embodiment of the present invention. FIG. 1A is a plan view of a light-wave circuit module of this embodiment, FIG. 1B is a cross-sectional view taken along the line B—B in FIG. 1A, and FIG. 1C is a cross-sectional view taken along the line C—C in FIG. 1A.

As shown in FIGS. 1A and 1B, the light-wave circuit module of this embodiment includes a substrate 1 having a substantially circular concave spot 11, an optically reflective film 12 formed along the inner side of the spot 11, and a planar optical waveguide 2 passing through the spot 11. The planar optical waveguide 2 in the spot 11 is formed on the substrate 1, with the optically reflective film 12 disposed between the substrate 1 and the planar optical waveguide 2. With this configuration, light that propagates along the planar optical waveguide 2 is reflected and focused obliquely upward by the optically reflective film 12 in the spot 11.

In other words, the configuration of the light-wave circuit module of this embodiment is such that the concave portion 11 with substantially spherical shape (also referred to as "substantially circular concave spot" or simply "circular concave spot") is provided on the substrate 1, and the optically reflective film 12 is provided along this concave portion 11. The optically reflective film 12 is a metal vapor deposition film of chrome, nickel or silver, for example. The concave portion 11 can also have a shape with a circular arc-shaped surface, such as the side face of a circular cylinder. Furthermore, it is also possible to leave out the optically reflective film 12 and to provide the concave portion 11 with an optically reflective surface that also serves as an optically reflective layer. In the present embodiment, the circumferential shape taken from the upper side of the concave portion 11 is circular, but it is not limited to circular shapes in the geometrical sense, and as long as it can reflect and focus the light of the optical waveguide 2, it is sufficient if it is substantially circular, and it can also be elliptical or circular with a straight line in some portion.

Also, as shown in FIGS. 1A and 1C, in this embodiment, a groove 2 with a rectangular cross section is provided through the concave portion 11 from one end in longitudinal direction of the substrate 1 to the other end. The optical waveguide 6 is provided along the groove 2 and the concave portion 11. The optical waveguide 6 includes a core layer and a cladding layer, and is formed of a strip-shaped polymer material. It is also possible to form the cladding layer of the optical waveguide 6 such that it covers the concave portion 11. If a plurality of grooves 2 are formed, then the optical waveguide 6 can be stripe-shaped. The optical waveguide 6 can be a stepped index or a graded index optical waveguide.

A photodetector 10 is provided on the concave portion 11. The photodetector 10 of this embodiment is a rear-side coupling photodetector 10, and its photodetecting portion, which receives the signal light, faces the concave portion 11. For the photodetector 10, it is possible to use a photodetector for optical fiber communication, which responds in the wavelength band from 1.3 ìm to 1.55 ìm, and a pin photodiode made of an InGaAs/InP system can be suitably used. In the example in the drawings, a configuration is shown in which a photodetector 10 is provided, but it is also possible to configure a PLC module by installing other optical function elements, such as a semiconductor laser, optical switches, optical branch couplers, etc., in addition to the photodetector 10.

In the light-wave circuit module of the present embodiment, the signal light that has passed through the optical waveguide 6 leaks at the concave portion 11 from the optical waveguide 6, and the portion of the leaking light that is reflected by the optically reflective film 12 is focused on a focal point, which is set by the shape of the concave portion. Consequently, also in the case of a wavelength multiplex PLC module, it is possible to receive spectrally divided light with high sensitivity. The depth of the focal point is determined by the diameter of the optical waveguide and the diameter of the concave portion, and the curvature of the concave portion is designed such that the most light is focused on the photodetecting portion of the photodetector 10.

To give an example of a specific configuration of the present embodiment, the diameter of the concave portion 11 is 20 $\mu$m to 200 $\mu$m, and the depth from the surface of the substrate 1 to the deepest portion of the concave portion is 10 $\mu$m to 100 $\mu$m. The thickness of the optically reflective film 12 is 0.05 to 1 $\mu$m in the case of a metal reflective film such as gold and 0.5 to 5 $\mu$m in the case of a dielectric multi-layer film. The width and the thickness of the groove of the planar optical waveguide 2 are both 5 to 20 $\mu$m. In the present embodiment, a cavity is provided between the photodetector 10 and the optical waveguide 2, but it is also possible to fill this space with a transparent material (for example quartz, glass or polymer material).

The optical waveguide 6 in the present embodiment is not limited to polymer materials, and can also be made of other types of transparent materials, such as quartz or glass. However, polymer materials are preferable considering cost and number of processing steps. Examples of suitable polymer materials include polymethylmethacrylate (PMMA), modified PMMA into which alicyclic groups have been introduced, polysiloxane derivatives, fluorinated polysiloxanes, fluorinated polyimides, epoxy resins, polyester resins, polycarbonates, urea resins, urethane resins and their copolymers. This is the same in the following embodiments.

For the substrate 1 in the present embodiment, any substrate selected from semiconductor wafers, glass plates, polymer sheets, ceramic sheets and layered substrates of these can be used. Semiconductor wafers of silicon (Si) or gallium arsenide (GaAs) for example are preferable because of the high processing precisions achieved by semiconductor processing technology. Also for glass substrates and ceramic sheets, there are high precision processing technologies, so that they can be applied easily. This is also the same in the following embodiments.

Alternatively, it is also possible to make the substrate 1 of a polymer material, like the optical waveguide 6. If the substrate 1 is made of a polymer material, then the thermal expansion coefficients of the two are about the same, so that stress and peeling effects can be avoided over a wide temperature range, and a light-wave circuit module with stable optical characteristics can be achieved. Specific examples of polymer materials that can be used for the substrate include a variety of engineering plastics, such as polycarbonates, polymethylmethacrylates, polyphenylsulfides, polyphenylsulfones, polyimides, and fluoroplastics. Moreover, if the optical waveguide 6 and the substrate 1 are made of the same material, then the adhesion between the two becomes strong.

If the substrate 1 is a polymer substrate, then the concave portion 11 can be formed by embossing, which makes the formation of the concave portion 11 easy. That is to say, embossing is a method for forming concave portions by applying heat and/or pressure to the substrate 1, so that the concave portion 11 can be formed in a simple manner. Consequently, if the concave portion 11 is formed by embossing, then it is easy to manufacture a high-performance light-wave circuit module, which is necessary for high-precision assembly.

It should be noted that it is of course also possible to form the concave portion 11 not by embossing, but by chemical etching. If a semiconductor single-crystalline substrate is used for the substrate 1, then the concave portion 11 can be easily formed with an etching solution without orientational selectivity, a viscous etching solution, or an etching solution containing a small amount of an organic solvent, such as alcohol. Moreover, it is possible to use not only chemical etching, but also physical etching.

Figure 2:
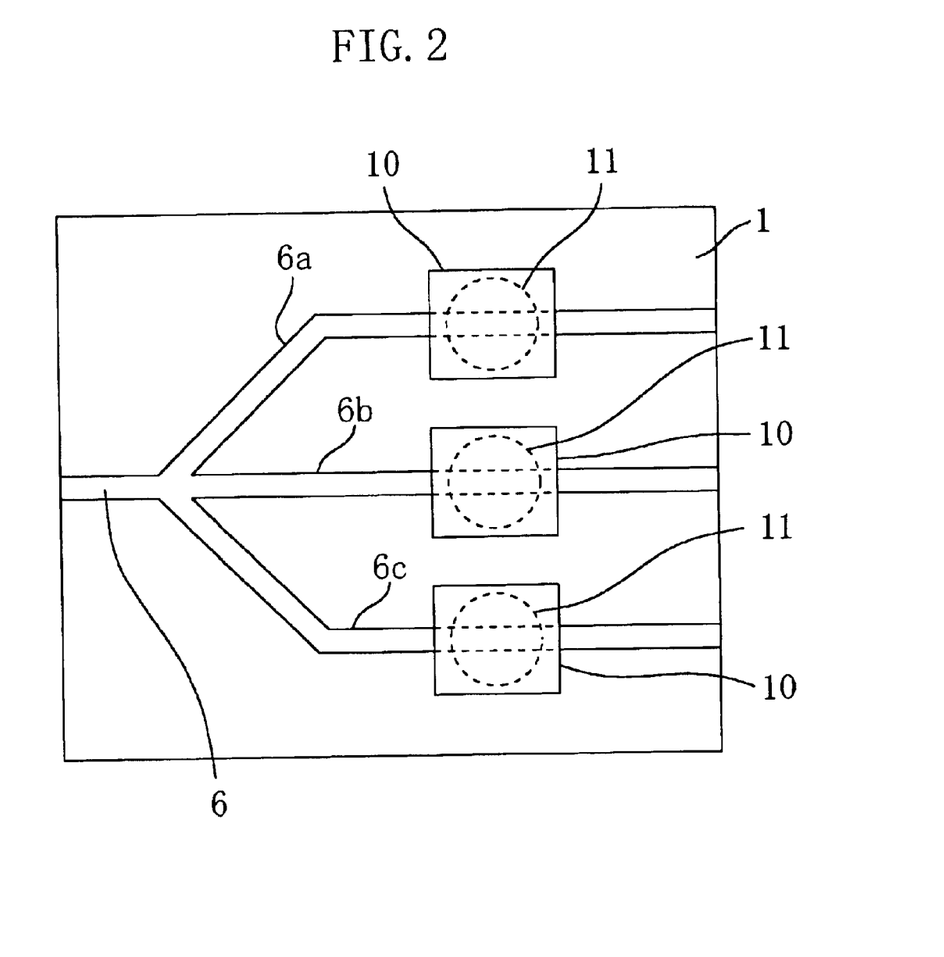
FIG. 2 is a plan view showing a modified example of the light-wave circuit module according to the first embodiment, provided with a plurality of concave portions and photodetectors.

FIG. 2 shows a modified example of the light-wave circuit module of this embodiment. In this example, a plurality of concave portions 11 and photodetectors 10 are provided.

As shown in FIG. 2, three concave portions 11 are formed on one substrate 1, and photodetectors 10 are provided on these respective concave portions 11. The optical waveguide 6 branches into three optical waveguides (6a, 6b and 6c). More specifically, one optical waveguide 6 branches from a branching point on the side of the photodetectors 10 into three portions (branching portions 6a, 6b and 6c), and each portion (6a, 6b and 6c) is provided with a concave portion 11 and a photodetector 10. A portion or all of these portions (6a, 6b and 6c) are made of a medium that transmits or reflects certain wavelengths, thus functioning as a filter. Furthermore, it is also possible to insert a filter layer into a portion of these portions (6a, 6b and 6c), or to provide them with a filtering function by forming a grating. Examples of media that transmit or reflect certain wavelengths include for example pigment-enriched polymers. Furthermore, examples of gratings and filter layers include fiber gratings and dielectric multi-layer films.

When a filtering function is added to the portions (6a, 6b and 6c) in the configuration shown in FIG. 2, then it can be operated as a branching filter separating a desired wavelength from a plurality of wavelengths. For example, if signal light waves of a plurality of wavelengths (for example three signal light waves) that are guided along the optical waveguide 6 are branched into these portions (6a, 6b and 6c), and the wavelengths filtered by these portions are received with the photodetectors 10 corresponding to these wavelengths, then an integrated circuit can be realized, which can receive these signal light waves. This technique can be applied not only to the present embodiment, but also to the following second and third embodiments. It should be noted that it is also possible to provide one optical waveguide (for example 6, 6a, 6b or 6c) with a plurality concave portions 11 and corresponding photodetectors 10.

Figure 3:
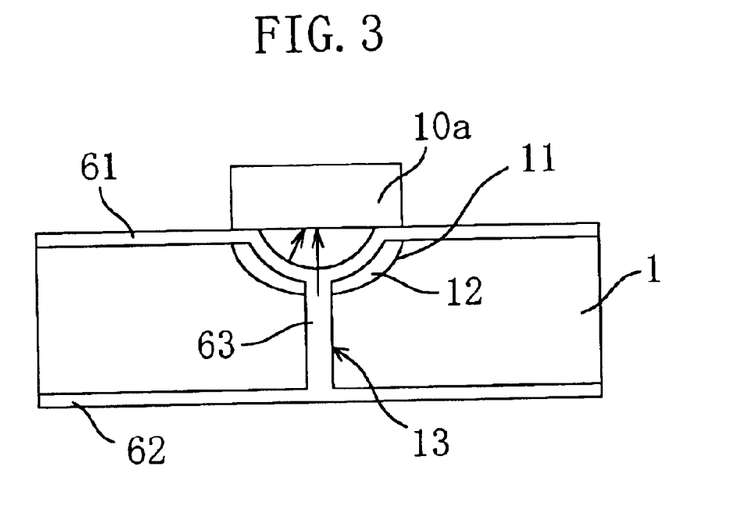
FIG. 3 is a cross-sectional view showing modified example of the light-wave circuit module of the first embodiment, provided with a through hole at the bottom of the concave portion.

FIG. 3 shows another modified example of the light-wave circuit module of the present embodiment. In this example, a through hole is provided at the bottom of the concave portion 11.

As shown in FIG. 3, the substrate 1 is provided with a through hole 13 extending from the bottom of the concave portion 11 to the rear surface of the substrate 1 (surface in opposition to the principal surface of the substrate 1). The principal surface of the substrate 1 is provided with a first optical waveguide 61, and the rear surface of the substrate 1 is provided with a second optical waveguide 62. A photodetector 10a, which can receive a plurality of signal light waves with one photodetecting surface is provided above the concave portion 11. The through hole 13 is filled with a translucent medium 63 that guides light. For this medium 63, typically, the same material as for the first and second optical waveguides 61 and 62 should be used. It is also possible to form an optical waveguide made of core and cladding in the through hole 13.

The through hole 13 can be formed by machining the substrate 1, and can be made for example by forming a through hole using a laser. It is also possible to form the through hole by mechanical machining. The diameter of the through hole 13 is for example 10 to 200 $\mu$m. If light is to be actively guided in the through hole, then an optical element for introducing the light in the second optical waveguide 62 into the through hole 13 (for example a microprism or a micromirror) should be arranged at the location where the through hole branches into the second optical waveguide 62. If a process at the level of simply monitoring the signal light in the second optical waveguide 62 is sufficient, then it is also possible to utilize the light that leaks into the through hole 13 without providing such an optical element.

With the configuration shown in FIG. 3, it is possible to receive with the photodetector 10a not only the signal light that is guided by the first optical waveguide 61, but, through the medium 36 in the through hole 13, also the light that is guided by the second optical waveguide 62. Thus, it becomes possible to provide optical waveguides not only on the principal surface of the substrate 1, but also on the rear surface of the substrate 1, so that optical waveguides can be installed at higher densities. That is to say, it is possible to realize multi-layer wiring of optical waveguides. In the configuration shown in FIG. 3, a two-layer structure is shown, but it is also possible to construct light-wave circuit modules with multi-layer wiring structures of three or more layers. Furthermore, if a medium transmitting or reflecting a certain wavelength is provided in a portion or all of the through hole 13, then it is possible to add a further filtering function.

Second Embodiment

Figure 4A:
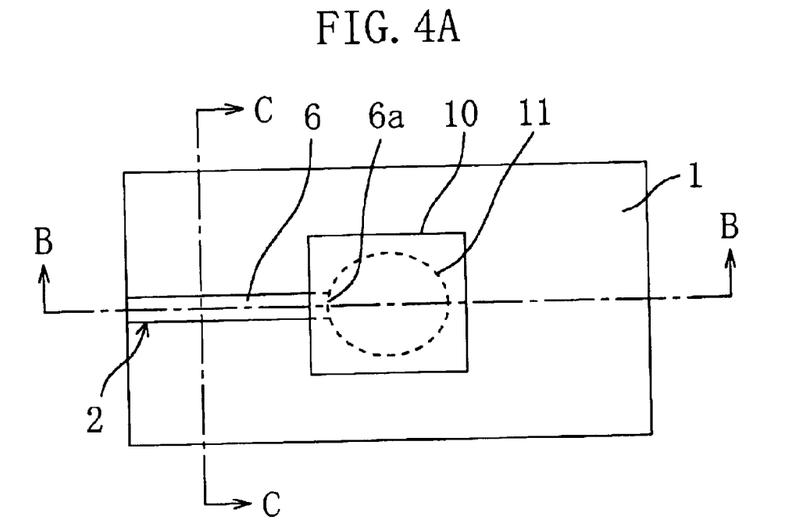
FIGS. 4A to 4C are, respectively, a plan view, a cross-sectional view taken along the line B—B, and a cross-sectional view taken along the line C—C of a light-wave circuit module according to the second embodiment of the present invention.
Figure 4B:
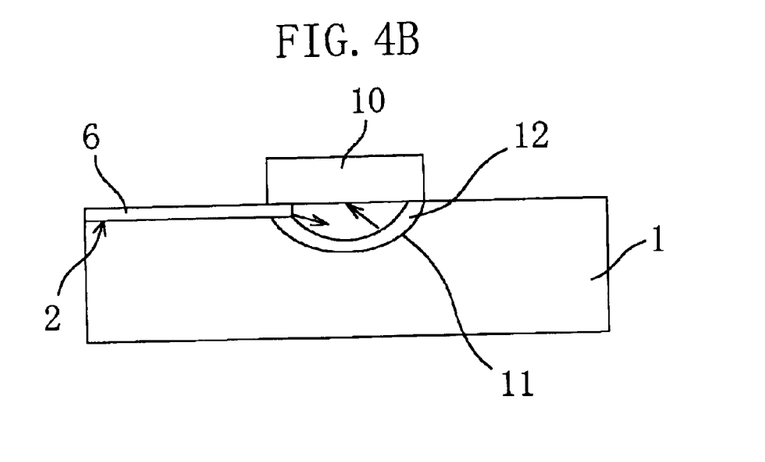
Figure 4C:
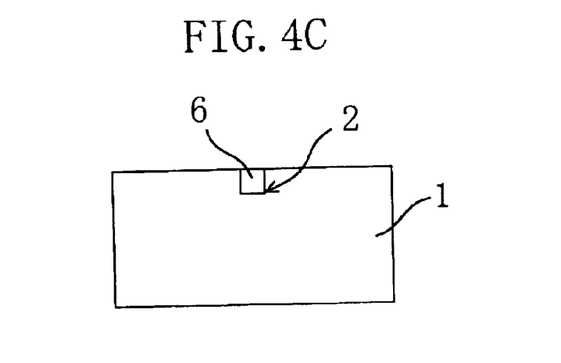

FIGS. 4A to 4C schematically show the configuration of a light-wave circuit module in accordance with a second embodiment of the present invention. FIG. 4A is a plan view of a light-wave circuit module of this embodiment, FIG. 4B is a cross-sectional view taken along the line B—B in FIG. 1A, and FIG. 1C is a cross-sectional view taken along the line C—C in FIG. 4A.

As shown in FIGS. 4A to 4C, the aspect in which the light-wave circuit module according to the second embodiment differs from the light-wave circuit module according to the first embodiment is that the groove 2 is formed from one edge of the substrate 1 to the concave portion 11, the optical waveguide 6 is formed on the groove 2, and the optical waveguide 6 is not provided on the concave portion 11. The optical waveguide 6 is arranged such that the end face 6a of the optical waveguide 6 on the side of the concave portion 11 is arranged near the concave portion 11. It should be noted that elements denoted by the same numerals as in the first embodiment operate substantially the same as in the first embodiment, so that their further explanation has been omitted.

With the configuration of this embodiment, light that is emitted from the end face 6a is reflected by the optically reflective film 12 provided in the concave portion 11, and the reflected light is focused on a focal point that is set by the shape of the concave portion. Consequently, signal light that is guided by the optical waveguide 6 is emitted from the end face 6a, so that the signal light can be utilized with high efficiency.

Third Embodiment

Figure 5A:
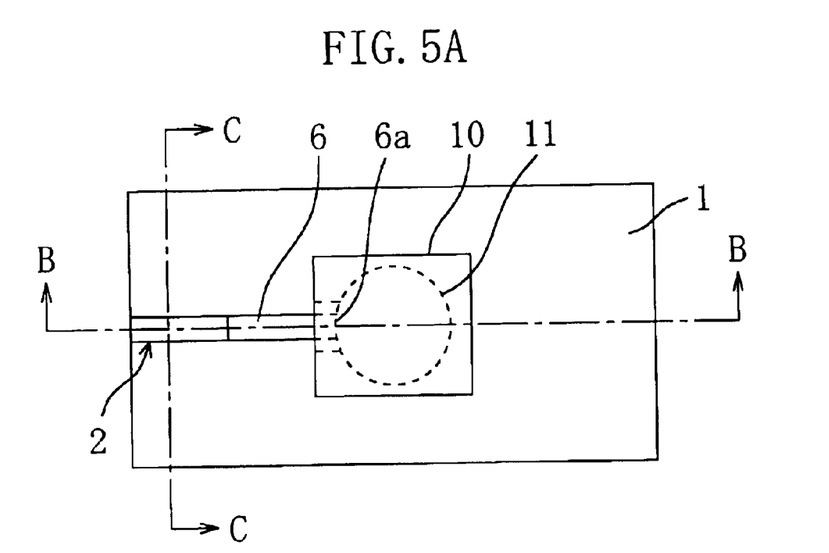
FIGS. 5A to 5C are, respectively, a plan view, a cross-sectional view taken along the line B—B, and a cross-sectional view taken along the line C—C of a light-wave circuit module according to the third embodiment of the present invention.
Figure 5B:
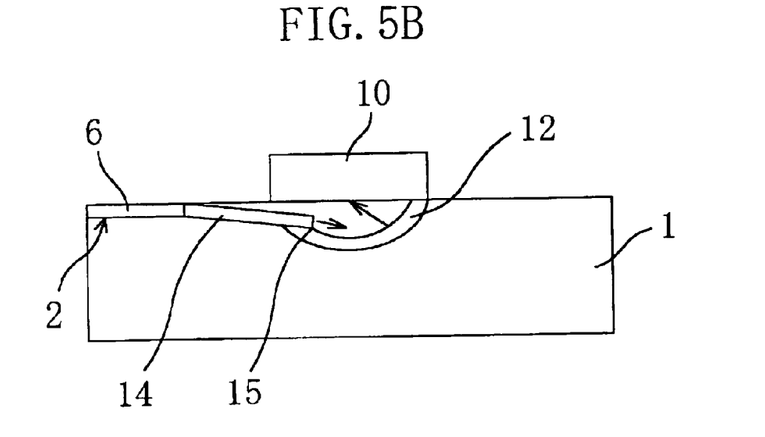
Figure 5C:
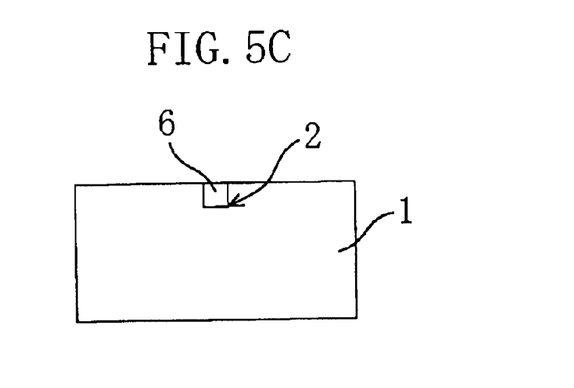

FIGS. 5A to 5C schematically show the configuration of a light-wave circuit module in accordance with a third embodiment of the present invention. FIG. 5A is a plan view of a light-wave circuit module of this embodiment, FIG. 5B is a cross-sectional view taken along the line B—B in FIG. 5A, and FIG. 5C is a cross-sectional view taken along the line C—C in FIG. 5A.

As shown in FIGS. 5A to 5C, the aspect in which the light-wave circuit module according to the third embodiment differs from the light-wave circuit module according to the second embodiment is that the groove 2 formed in the substrate 1 is provided with a slanted portion 14, which is slanted at a certain angle with respect to the surface of the substrate 1. More specifically, a slanted path 14 linked to at least a portion of the perimeter of the spot 11 is formed by providing the groove 2 with a certain angle. The slanted path 14 is formed such that a major portion of the light that is emitted from the optical waveguide 6 is reflected by the concave portion 11 on which the optically reflective film 12 is disposed.

The slanted path 14 is a portion of the strip-shaped groove 2, and has the same width as the groove 2. Furthermore, the slanted path 14 is slanted toward the bottom of the concave portion 11, and has a certain angle (slant angle) with respect to the principal surface of the substrate 1. The slant angle can be set to a suitable value in consideration of other parameters, and is for example 20 to 60°. It should be noted that elements denoted by the same numerals as in the first embodiment operate substantially the same as in the first embodiment or the second embodiment, so that their further explanation has been omitted. Numeral 15 denotes an slanted path contact point.

In the present embodiment, the slanted path 14, which is slanted toward the bottom of the optically reflective film 12, is provided, so that a major portion of the light that is emitted from the end face 6a of the optical waveguide 6 can be reflected by the optically reflective film 12, and the reflected light can be focused on a focal point that is set by the shape of the concave portion. Consequently, with the light-wave circuit module of the present embodiment, more of the signal light that is emitted from the end face 6a of the optical waveguide 6 can be reflected by the optically reflective film 12 than in the light-wave circuit module of the second embodiment, so that the light guided by the optical waveguide 6 can be utilized without loss and with high efficiency. Furthermore, if emitted signal light is to be reflected with high efficiency toward the photodetector 10 (upward), then it is preferable that the groove 2 in the second embodiment is formed to be relatively deep, but in this embodiment, the slanted path 14 is provided, so that even when the groove 2 is not so deep, the signal light emitted from the end face 6a of the optical waveguide 6 can be reflected with high efficiency toward the photodetector 10 (upward).

Fourth Embodiment

Figure 6A:
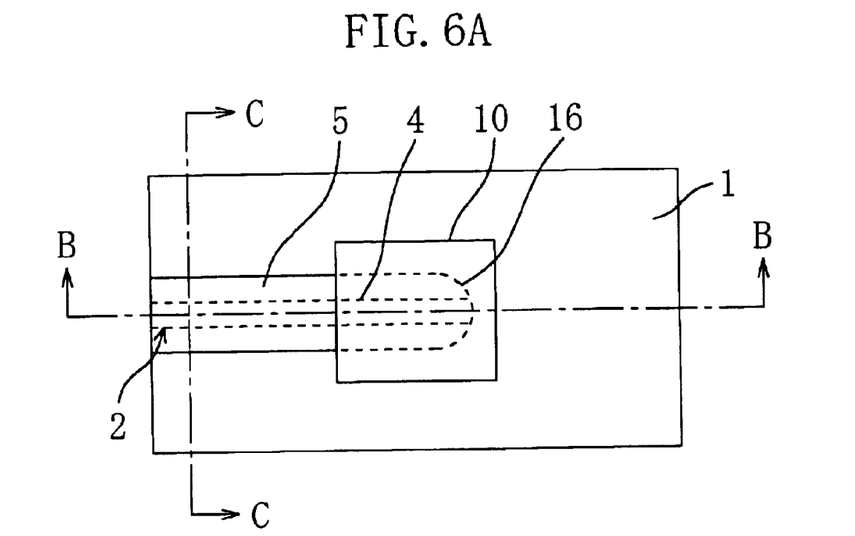
FIGS. 6A to 6C are, respectively, a plan view, a cross-sectional view taken along the line B—B, and a cross-sectional view taken along the line C—C of a light-wave circuit module according to the fourth embodiment of the present invention.
Figure 6B:
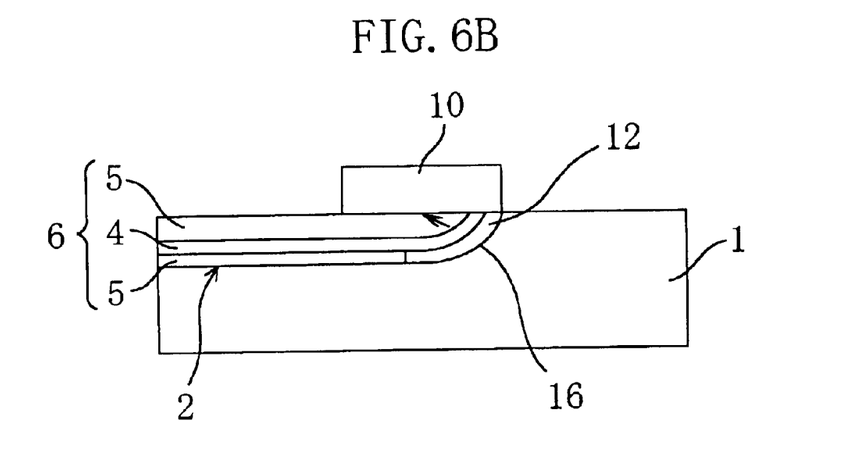
Figure 6C:
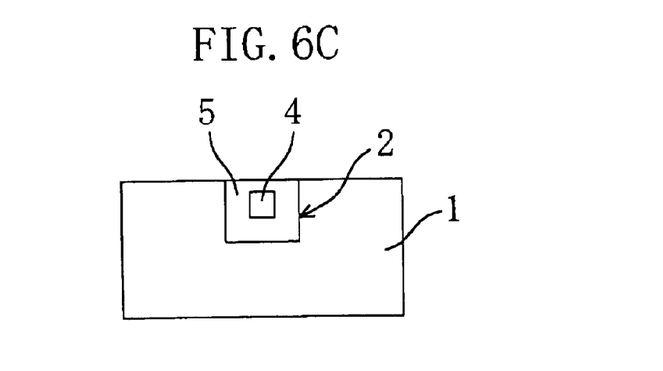

FIGS. 6A to 6C schematically show the configuration of a light-wave circuit module in accordance with a fourth embodiment of the present invention. FIG. 6A is a plan view of a light-wave circuit module of this embodiment, FIG. 6B is a cross-sectional view taken along the line B—B in FIG. 6A, and FIG. 6C is a cross-sectional view taken along the line C—C in FIG. 6A.

As shown in FIGS. 6A to 6C, the light-wave circuit module according to this embodiment is provided with a concave step portion 16, which reflects light that is guided by the optical waveguide 6 that is provided in the groove 2 formed in the substrate 1. The optically reflective film 12 is provided on this concave step portion 16. The optically reflective film 12 is a metal vapor deposition film of chrome, nickel or silver, for example. In this embodiment, the concave step portion 16 has a structure whose surface is formed like a portion (for example one quarter) of a substantially spherical shape, as shown in FIGS. 6A and 6B, but it can also be a structure having a circular arc-shaped surface, such as the side face of a circular cylinder.

The bottom surface of the groove 2 is located near the bottom surface of the optically reflective film 12, and in the present embodiment, the surface of the groove 2 and the surface of the concave step portion 16 are continuous. In other words, the junction portion of the two surfaces is substantially flush. The optical waveguide 6 is formed along the shape of the groove 2 and the concave step portion 16. The substrate 1 is partitioned by the concave step portion 16 into an upper surface portion of the step located on the upper side of the concave step portion 16 and a lower surface portion of the step located on the lower side of the concave step portion 16. The groove 2 is formed in this lower surface portion of the step.

As shown in FIG. 6C, the cross section of the groove 2 is rectangular. The core layer 4 of the optical waveguide 6 formed by a polymer material is formed continuously on the cladding layer 5 located on the lower side in the groove 2 and the optically reflective film 12 formed on the concave step portion 16, as shown in FIG. 6B. Moreover, the cladding layer 5 on the upper side is formed on top of and around the core layer 4, such that it fills the groove 2. In other words, the core layer 4 is formed on the lower cladding 5 and the optically reflective film 12, and the upper cladding layer 5 is formed on the lower cladding layer 5 (and the optically reflective layer 12), so that it covers the core layer 4.

To give an example of a specific configuration of the present embodiment, the thickness of the core layer 4 is 5 to 20 $\mu$m, and the thickness of the lower cladding layer and the upper cladding layer 5 is 1 to 50 $\mu$m and 10 to 100 $\mu$m, respectively. Also, the height between the upper surface portion of the step and the lower surface portion of the step in the concave step portion 16 is 16 to 170 $\mu$m, and the thickness of the optically reflective film 12 is 0.05 to 5 $\mu$m. The width and the depth of the groove are both 16 to 170 $\mu$m.

With the configuration of this embodiment, signal light that is guided along the optical waveguide 6 is reflected by the optically reflective film 12 in the concave step portion 16, and the reflected light can be focused on a focal point that is set by the shape of the concave portion. Also, by providing the photodetector 10 as a function element on the substrate 1, a PLC module can be produced, in which optical losses are reduced as much as possible. In addition, with the configuration of this embodiment, it is possible to form the end face of the optical waveguide 6 without cutting it with high precision.

Referring to FIGS. 7A to 7F, the following explains a method for manufacturing the light-wave circuit module of the present embodiment. FIGS. 7A to 7F are cross-sectional process diagrams illustrating a manufacturing method of the present embodiment.

Figure 7A:
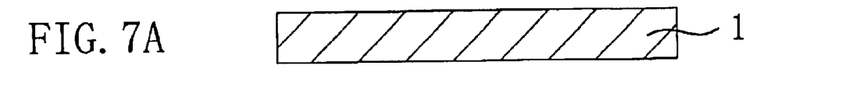
FIGS. 7A to 7F are cross-sectional process diagrams illustrating a method for manufacturing a light-wave circuit module according to the fourth embodiment.
Figure 7B:
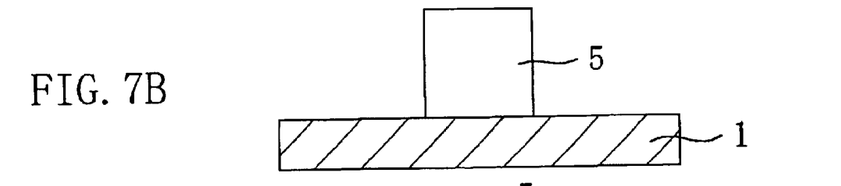

First of all, as shown in FIG. 7A, a substrate 1 is prepared, and then, as shown in FIG. 7B, a cladding layer 5 is formed on that substrate 1. The cladding layer 5 can be formed by applying a cladding material by spin-coating, subsequently baking it, and removing the resulting uniform film while leaving the portions that are protected by a resist film, for example.

Figure 7C:
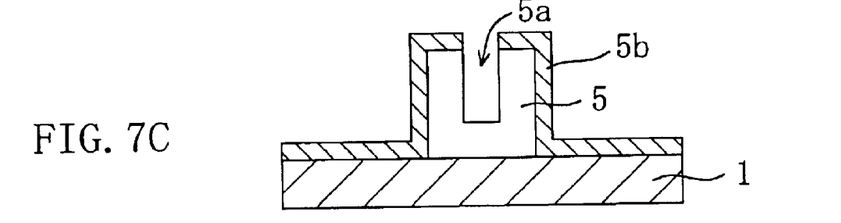

Then, as shown in FIG. 7C, an aperture portion (or groove) 5a for forming the core layer 4 is formed in the cladding layer 5. This aperture portion 5a can be formed by protecting the cladding portion with a resist film 5b, and subsequently etching, for example.

Figure 7D:
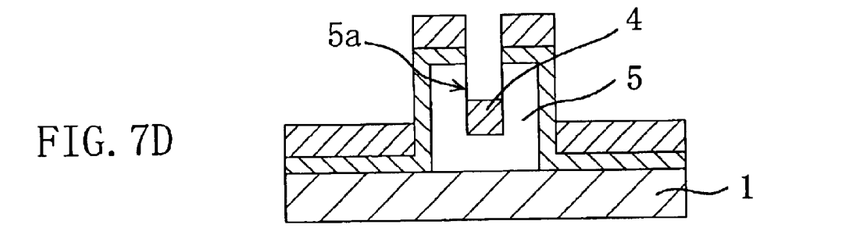

Then, as shown in FIG. 7D, the core layer 4 is formed in the aperture portion 5a of the cladding layer 5. More precisely, the core layer 4 is formed such that it is located in the middle of the cladding layer 5, or in other words, such that the core layer 4 covers the bottom side and the lower portions of the side walls of the aperture portion 5a. The core layer 4 can be formed by applying a core material by spin-coating and subsequently baking it, for example.

Figure 7E:
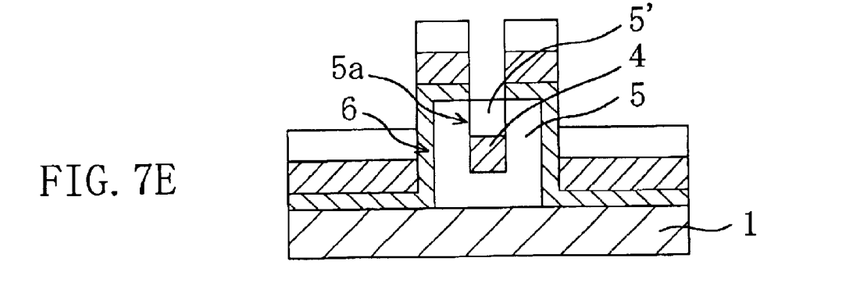

Then, as shown in FIG. 7E, the cladding layer (upper cladding layer) 5' is layered in the aperture portion 5a, such that it covers the upper side of the core layer 4. The layering process of the upper cladding layer 5' can be carried out by coating a cladding material as for the core layer, and then curing it, for example. After this, the unnecessary cladding layer and core layer are removed when the resist film 5b is removed. Thus, an optical waveguide 6 made of a core layer 4 and a cladding layer 5 is produced.

Figure 7F:
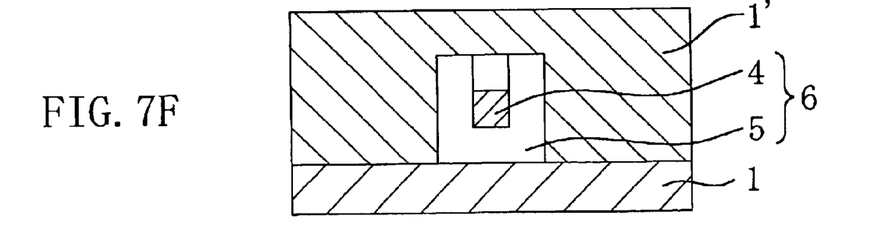

Finally, the same material as of the substrate 1 or a similar material 1' is deposited on the substrate 1, covering the optical waveguide 6, thus forming the upper portion of the substrate 1. The upper portion of the substrate 1 can be formed by applying a polymer material and baking it, for example.

After that, to obtain the configuration shown in FIGS. 6A to 6C, the upper portion of the substrate 1 is abraded or etched away until the upper surface of the cladding layer 5 is exposed, and then, the photodetector 10 is disposed at a predetermined location. For the substrate 1 shown in FIG. 7A, it is possible to use for example a substrate, in which the concave step portion 16 and the optically reflective film 12 have been formed in advance. It is also possible to prepare a substrate 1 in which the concave step portion 16 has been formed, and to form the optically reflective film 12 along the slanted surface of the concave step portion 16 prior to the step of forming the core layer 4 (see FIG. 7D). Alternatively, instead of the substrate 1 shown in FIG. 7A, it is also possible to prepare a substrate into which the groove 2 has been formed in advance, and to employ an approach of forming the optical waveguide 6, including the cladding layer 5 and the core layer 4, into this groove 2. Also in the case of this approach, the optically reflective film 12 should be formed along the slanted surface of the concave step portion 16 prior to the step of forming the core layer. It should be noted that it is also possible to utilize practically this approach to produce the optical waveguide 6 in the first to third embodiments.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description. All changes that come within the meaning and range of equivalency of the claims are intended to be embraced therein.

What is claimed is:

1. A light-wave circuit module comprising:
   a substrate having a spot of substantially circular concave shape;
   an optically reflective film formed along an inner surface of said spot; and
   a planar optical waveguide passing through said spot;
   wherein light of said optical waveguide is reflected and focused obliquely upward by said optically reflective film in said spot.

2. The light-wave circuit module according to claim 1, wherein a portion of said planar optical waveguide is located in said spot;
   said portion of the planar optical waveguide is formed on said substrate, said optically reflective film being disposed between said portion of said planar optical waveguide and said substrate; and
   light that is guided along said planar optical waveguide leaks into said spot and is focused on a focal point that is set by said substantially circular concave shape.

3. The light-wave circuit module according to claim 1, wherein said planar optical waveguide is made of a transparent translucent resin.

4. A light-wave circuit module comprising:
   a substrate having a spot of substantially circular concave shape; and
   a groove that is formed on said substrate and linked to a portion of a perimeter of said spot;
   wherein at least a portion of a planar optical waveguide is formed in said groove;
   wherein an optically reflective film is formed on an inner surface of said spot;
   wherein an end face of said planar optical waveguide is located at a periphery of said spot; and
   wherein light that is guided by said optical waveguide enters said spot from said end face and is focused on a focal point that is determined by said substantially circular concave shape.

5. The light-wave circuit module according to claim 4, wherein said planar optical waveguide is made of a transparent translucent resin.

6. A light-wave circuit module comprising:
   a substrate having a spot of substantially circular concave shape; and
   a slanted path that is formed on said substrate and linked to at least a portion of a perimeter of said spot;
   wherein at least a portion of a planar optical waveguide is formed on said slanted path; and
   wherein, on an inner surface of said spot, an optically reflective film is formed at least on a side that is in opposition to the side linked to said slanted path.

7. The light-wave circuit module according to claim 6, wherein said planar optical waveguide is made of a transparent translucent resin.

8. A light-wave circuit module comprising:
   a substrate having a spot of concave shape; and
   a groove that is formed on said substrate and linked to a portion of a perimeter of said spot;
   wherein at least a portion of a planar optical waveguide is formed in said groove;
   wherein an optically reflective film is formed on an inner surface of said spot; and
   wherein a bottom surface of said groove is located near a bottom surface of said optically reflective film in said spot.

9. The light-wave circuit module according to claim 8, wherein said planar optical waveguide is made of a transparent translucent resin.

10. A light-wave circuit module comprising:
    a substrate on which a plurality of spots of substantially circular concave shape are formed; and
    an optically reflective film formed along inner surfaces of said spots;
    wherein said spots are linked by a planar optical waveguide.

11. The light-wave circuit module according to claim 10, wherein said planar optical waveguide includes branched portions;

wherein said branched portions are linked to said spots, and at least a portion of said branched portions has the function to transmit or reflect a certain wavelength; and wherein photodetectors are provided above said spots.

12. The light-wave circuit module according to claim 10, wherein said planar optical waveguide is made of a transparent translucent resin.

13. A light-wave circuit module comprising:

a substrate having a first surface and a second surface substantially in opposition to the first surface;

a spot of substantially circular concave shape that is formed on said first surface of said substrate; and an optically reflective film that is formed along an inner surface of said spot;

wherein a first planar optical waveguide is provided on said first surface;

wherein a second planar optical waveguide is provided on said second surface;

wherein said first planar waveguide is linked to said spot;

wherein a through hole connecting said first surface and said second surface is formed in a portion of said spot; and wherein said second planar optical waveguide is linked to said spot through a translucent medium that is filled into said through hole.

14. The light-wave circuit module according to claim 13, wherein said planar optical waveguides are made of a transparent translucent resin.

15. A light-wave circuit module, comprising:

a step portion having a substantially circular arc-shaped surface or substantially spherical surface, formed on a substrate;

an optical waveguide formed on said substrate; and a photodetector arranged above said step portion and receiving light that has been transmitted by said optical waveguide and reflected by said step portion.

16. A light-wave circuit module, comprising:

a concave portion having a substantially circular arc-shaped surface or substantially spherical surface, formed on a substrate;

an optical waveguide formed on said substrate; and a photodetector arranged above said concave portion and receiving light that has been transmitted by said optical waveguide and reflected by said concave portion.

17. The light-wave circuit module according to claim 16, wherein at least a portion of said optical waveguide is slanted with respect to a principal surface of said substrate.

18. The light-wave circuit module according to claim 17, wherein an optically reflective film is formed on an inner surface of said concave portion.

19. A method for manufacturing a light-wave circuit module including a substrate having a spot of substantially circular concave shape and an optical waveguide linked to said spot, said method comprising:

a step of preparing a substrate made of a polymer sheet;

a step of forming a concave surface of said spot by subjecting said substrate to embossing by applying at least one selected from heat and pressure; and a step of forming an optical waveguide linked to said spot.

20. The method of manufacturing a light-wave circuit module according to claim 19, wherein an optically reflective film is formed on an inner surface of said concave portion.

* * * * *